June 10, 1941. E. ORSHANSKY, JR 2,244,850
CONTROL
Filed Dec. 1, 1938 2 Sheets-Sheet 1
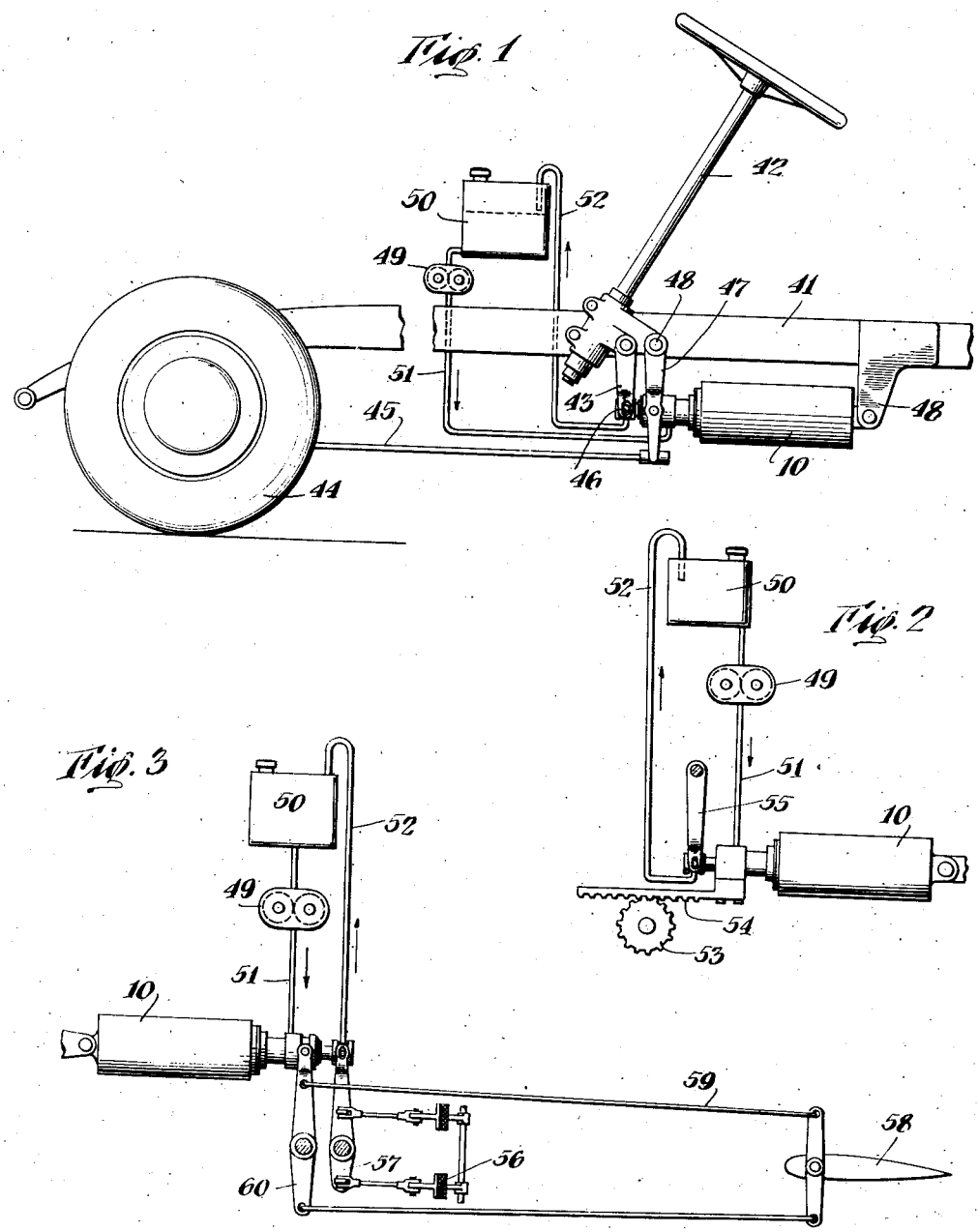
INVENTOR
Elias Orshansky, Jr.
ATTORNEYS

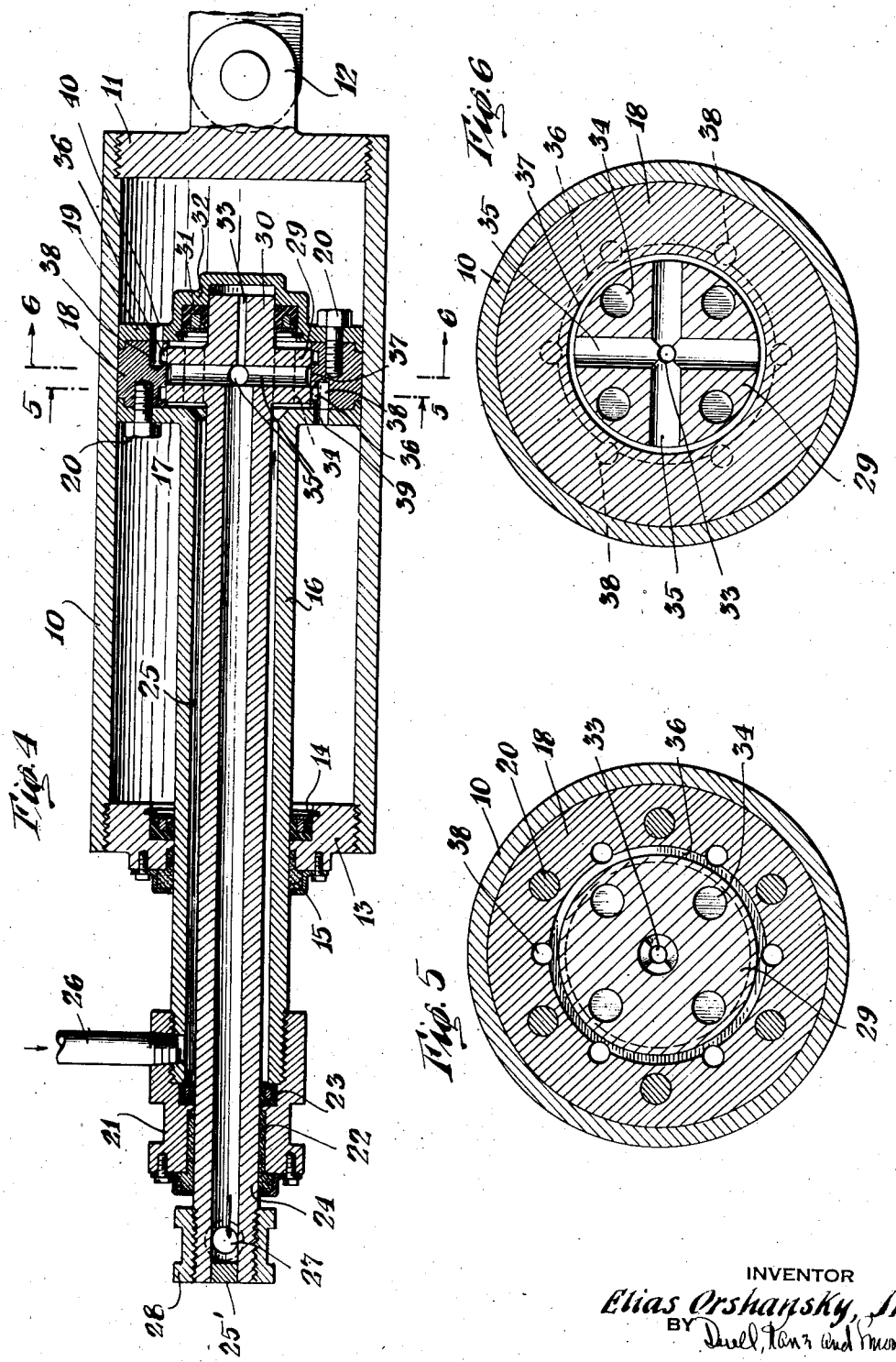

Patented June 10, 1941

2,244,850

UNITED STATES PATENT OFFICE 2,244,850

CONTROL

Elias Orshansky, Jr., Deep River, Conn., assignor to The Acrotorque Company, New Haven, Conn., a corporation of Connecticut Application December 1, 1938, Serial No. 243,341

4 Claims. (Cl. 121—41)

This invention relates to a functionally and structurally improved control capable of use in numerous different associations.

It is an object of the invention to furnish a unit of this character which may be employed in connection with virtually any desired type of apparatus and where the adjustment or control of such apparatus requires the expenditure of relatively high effort and it is desired to effect the control with minimum effort.

A further object is that of furnishing a unit of this type which will embody relatively simple construction including few parts capable of unitary assembly, and operating over long periods of time with freedom from all difficulties.

With these and other objects in mind, reference is had to the attached sheets of drawings illustrating one practical embodiment of the invention, and in which:

Fig. 1 shows the control applied to a motor vehicle for the purpose of steering the same;

Fig. 2 illustrates the control in association with a rack which is to be reciprocated;

Fig. 3 is a view diagrammatically illustrating the association of the control member with a steering apparatus such as occurs, for example, in aircraft;

Fig. 4 is a longitudinal sectional view through the control; and

Figs. 5 and 6 are slightly enlarged transverse sectional views taken along the lines 5—5 and 6—6, and in the direction of the arrows as indicated in Fig. 4.

While a control embodying the improved construction of the present invention may be employed in numerous different associations, improved and desirable applications of the same have been illustrated in the first three figures of the accompanying drawings. It is to be understood, however, that except where hereinafter limited in the claims, the control may be employed in numerous different associations and wherever an apparatus of this type may prove desirable.

Thus, referring primarily to Figs. 4, 5, and 6, it will be seen that the numeral 10 indicates a casing providing a cylinder, one end of which is closed by a head 11 which may be solid and provided with a mounting portion 12. The opposite end of this cylinder is closed by a cap or head 13 provided with suitable packings 14 and 15 in order to engage and seal against the exterior surface of a tube 16 capable of reciprocation with respect to the cylinder. The inner end of this tube extends within the cylinder body and terminates in a head including, for example, sections 17, 18 and 19, which may be bolted against movement with respect to each other as at 20. This unit provides a piston, the function of which will be hereinafter described.

Adjacent its outer end, tube 16 may be provided with a collar 21 which also mounts packings 22 and 23, encircling and in sealing contact with a tube 24 telescopically disposed with respect to tube 16. As will be observed the diameters of these tubes are such that a space 25 exists between them, and communicating with this space is a tube 26.

The outer end of tube 24 is closed, for example, by a plug 25' and the bore of this tube may communicate with a passage or fitting 27 mounted adjacent its outer end. Also mounted adjacent this outer end is a collar 28 or any other similar device providing a portion of a coupling such that the outer tube end may be connected to a controlling element.

The inner end of this tube terminates in a head 29 disposed within the head provided by sections 17, 18, and 19, the size of the parts being such that limited movement of the heads may occur with respect to each other. Head 29 is preferably provided with a portion 30 engaged by packing 31 mounted within the cup shaped extension 32 of section 19 and this portion is, as shown, formed with a bore 33 in line with the bore of tube 24. Moreover, head 29 is formed with transverse bores 34 as well as radial bores or passages 35 communicating with the bore of tube 24 and bore 33.

The head comprising sections 17, 18 and 19 may, of course, be formed of a smaller or larger number of units, although it is preferred in the interest of economy as well as for the purpose of convenience in machining that three sections be utilized. Thus, as illustrated, the center section 18 is formed with annular grooves 36 spaced to either side of its center portion 37 and communicating with passages 38 formed in both of its faces, it being noted that these passages do not extend entirely through the body of section 18.

In line with the latter passages, sections 17 and 19 are formed with openings 39 and 40, the latter affording access to the opposite ends of the cylinder.

Now, assuming that tube 16 is connected to a source of fluid under pressure, it will be understood that the fluid will flow through space 25 and with the parts in position as shown in Fig. 4, this fluid will pass either directly radially and slowly escape through one of the grooves 36, passages 38 and openings 39 to one end of the cylinder, or else will flow through bores 34 and thence radially through the second groove 36, passages 38 and openings 40 towards the other end of the cylinder. A certain amount of seepage will occur and this will have no detrimental effect because it will simply result in a flow of fluid inwardly through passages 35, through the bore of tube 24, and so out through the fitting 27. While on the subject of the fluid, it will be understood that any desired medium might be employed, but it is preferred to utilize oil of suitable thickness and supplied under any desired pressure through the medium of a pump coupled to fitting or inlet 26. The fitting or outlet 27 may be coupled to the pump sump or otherwise as desired.

With the parts in the position shown in Fig. 4, it will, of course, be understood that the flow of fluid will be negligible and in fact, if the parts are fitted with sufficient precision, the flow may be substantially if not completely interrupted so that no discharge will occur from fitting 27. If tube 24 is moved to the left, as viewed in Fig. 4, it will be understood that a substantially uninterrupted passage is provided from the space 25 through passages 34 to the right-hand groove 36, bores 38 and openings 40. Accordingly, the right-hand side of the cylinder will receive fluid under pressure and the piston will move to the left until the head 29 once more occupies the same relative position with respect to the parts of section 18 as is illustrated in the figure under consideration.

With such movement of the piston, fluid will be displaced from the left-hand end of the cylinder and this flow is readily permitted incident to the fact that the fluid will simply pass through openings 39, passages 38 and 35 to the bore of tube 24. It is apparent that movement of tube 24 in a right-hand direction as viewed in Fig. 4, will permit a flow from space 25 to groove 36 and thence through passages and openings 38 and 39 to the left-hand side of the cylinder. Likewise, the fluid displaced in the right-hand side of the cylinder will freely flow through openings 40, passages 38, bores 35 and thence through tube 24. At this time it will also be observed that any fluid which may collect beyond the end portion 30 of tube 24 may be vented through passage 33 so that no "pocketing" effect will result.

Thus, in each instance it will be obvious that an operator with practically no effort may shift tube 24 with respect to tube 16 and such shifting will cause a continued movement of the piston in either direction and according to the direction in which tube 24 has been moved. This shifting will continue so long as the parts are relatively displaced but the instant the relationship of the same is established—as shown for example in Fig. 4—further movement of the parts will cease.

It is apparent that with part 21, or any other desired portion of tube 16, coupled to an element to be moved and the cylinder 10 anchored against movement—or vice versa—that a positive movement of the parts will result. The effective force exerted will be limited only by the area of the piston assembly and the pressures which are employed.

Now to exemplify certain of the preferred associations in which the control may be employed, attention is directed to Fig. 1. In this view the numeral 41 indicates the chassis of a vehicle provided with a steering wheel 42 and from which in the usual manner a conventional pitman arm 43 extends. The forward wheels 44 of the vehicle are also provided with the conventional steering link 45. However, instead of connecting the arm 43 directly to the link 45, it is coupled as at 46 to the end of tube 24. The link is connected by an auxiliary pitman arm 47 to the tube 16 and this arm is pivotally mounted as, for example at 48. In order to prevent any binding of the parts, the connection 46 may, as shown, be of the pin and slot type, or any other form of construction may be employed at this point to permit of oscillation of the arms 43 and 47 free from any undesirable strains or distortions. The cylinder 10 is, of course, connected to the frame as for example by a bracket 48.

The motor (not shown) serves to drive an oil pump 49 which may be coupled to a reserve tank 50 and the pressure line 51 extending from the pump is connected to fitting 26, while a return line 52 extends between the reservoir and fitting 27. Incident to the fact that the parts have relative movement, it will, of course, be understood that lines 51 and 52 should be of flexible type, or any other suitable expedient should be resorted to to avoid difficulties in this connection.

It is apparent that as an operator rotates the steering wheel and pitman, he will in the usual manner cause an oscillation of arm 43. This will, in turn, result in tube 24 being shifted with respect to tube 16 to cause a forceful movement of the cylinder 10 and tube 16 with respect to each other. Due to the fact that arm 47—for example—connects tube 16 with link 45, a power steering is effected and all the energy which the operator will have to employ is that necessary to effect movement of arm 43. If, for any reason, the supply of fluid under pressure should fail, then the apparatus with which the control is connected will still function for the reason that arm 43 will rock, causing movement of tube 24 until the head of the latter strikes against the adjacent inner face of the piston within which it is disposed. Thereupon, continued movement of the arm will result in the tube 16 shifting to accordingly shift arm 47 and the link 45. In such shifting, the fluid in either end of the cylinder will be properly vented so that back pressures will not occur, and thus the only added burden thrown upon the operator will be the frictional contact of the parts in that he may otherwise operate the mechanism with the same effort as would be required to cause a normal manual control to be effected.

In Figure 2 it has been proposed to effect a power rotation of a pinion 53 by means of a rack 54. To this end the latter is connected to tube 16 and tube 25 is connected by a clamp 55 or otherwise to a manual, or other, control station. A pump and line assembly corresponding to that heretofore described, is again provided and it will be apparent that as arm 55 is rocked, or otherwise, moved, rack 54 will reciprocate to rotate pinion 53.

Again in Figure 3, a pump and power line assembly has been shown and in this installation there has been illustrated a control for a rudder or similar unit, such as may be associated with aircraft. To this end, pedals 56 may, for example, be coupled to a rudder bar 57. The rudder, or other control surface, 58 is pivotally mounted and connected by cable or rods 59 to a supplemental rudder bar 60. One end of the latter may be connected to tube 16 while one end of bar 57 may be connected to tube 24. It will again be apparent that the pilot in the usual manner may actuate pedals 56 to oscillate rudder bar 57. Such actuation will forthwith result in a power operation of bar 60 to control surface 58. Also, should a power failure occur nothing untoward will result for the reason that the pilot may still control surface 58 by simply employing the manual effort which would normally be required to effect such control plus the additional effort which is necessary to overcome the frictional contact of the parts within the cylinder.

The applications which are possible within the scope of the present control are manifold. Suffice it to say that the foregoing represents in many respects the preferred associations. The amount of "play" between the parts should manual actuation be necessary due to power failure, will be negligible because it is obvious that the relative movements of tubes 16 and 25 are comparatively minute.

Thus among others the several objects of the invention as specifically aforenoted are achieved. Obviously numerous changes in construction and rearrangement of the parts might be resorted to without departing from the spirit of the invention as defined by the claims.

Having described my invention what I claim as new and desire to secure by Letters Patent is:

1. A control including a cylinder presenting one closed end portion, a hollow piston slidable within said cylinder, said piston having an end portion and a central portion, the internal diameter of the latter portion being greater than that of the former, a tube connected to said piston and having its bore communicating with the hollow interior thereof, a head formed with an opening for the passage of said tube and mounted by the other end of said cylinder, said tube having sliding and sealing contact with said head, a control tube extending within the bore of said first named tube and beyond the end of the same, said control tube having its external diameter smaller than the internal diameter of said first named tube whereby to provide a passage for the flow of fluid between said tubes, a head portion fixed to the interior end of said control tube and formed with a series of radially extending passages communicating with its bore, said head having an end portion and a central portion, the external diameter of the latter being greater than that of the former and said end portion being adapted to slidably engage the end portion of said piston, said end portion being provided with a transverse passage for conducting fluid away from the end portion of said piston, said head portion being also formed with transversely extending passages having no direct communication with said first named passages, the hollow space within said piston being of greater width than the width of said head portion whereby the latter may be reciprocated within the same, a valve portion forming a part of said piston and cooperative with the radially extending passages of said head portion to alternatively divert a flow of fluid to either side of said valve portion and through said passages, said piston being formed with openings to either side of said valve portion and extending towards the adjacent cylinder ends, coupling means associated with the closed end portion of said cylinder, and further coupling means secured to said first named tube.

2. A control including a cylinder, a hollow piston slidable within said cylinder, said piston having an end portion and a central portion, the internal diameter of the latter portion being greater than that of the former, a tube connected to said piston and having its bore communicating with the hollow interior thereof, a control tube extending within the bore of said first named tube and beyond the end of the same, said control tube having its external diameter smaller than the internal diameter of said first named tube whereby to provide a passage for the flow of fluid between said tubes, a head portion fixed to the interior end of said control tube and formed with a series of radially extending passages communicating with its bore, said head having an end portion and a central portion, the external diameter of the latter being greater than that of the former and said end portion being adapted to slidably engage the end portion of said piston, said end portion being provided with a transverse passage for conducting fluid away from the end portion of said piston, said head portion being also formed with transversely extending passages having no direct communication with said first named passages, the hollow space within said piston being of greater width than the width of said head portion whereby the latter may be reciprocated within the same, a valve portion forming a part of said piston and cooperative with the radially extending passages of said head portion to alternatively divert a flow of fluid to either side of said valve portion and through said passages, said piston being formed with openings to either side of said valve portion and extending towards the adjacent cylinder ends, a guide portion connected to said head portion and extending beyond the same, and a receiving element carried by said piston and having slidable contact with said guide portion.

3. A control including a cylinder, a hollow piston slidable within said cylinder, said piston having an end portion and a central portion, the internal diameter of the latter portion being greater than that of the former, a tube connected to said piston and having its bore communicating with the hollow interior thereof, a control tube extending within the bore of said first named tube and beyond the end of the same, said control tube having its external diameter smaller than the internal diameter of said first named tube whereby to provide a passage for the flow of fluid between said tubes, a head portion fixed to the interior end of said control tube and formed with a series of radially extending passages communicating with its bore, said head having an end portion and a central portion, the external diameter of the latter being greater than that of the former and said end portion being adapted to slidably engage the end portion of said piston, said end portion being provided with a transverse passage for conducting fluid away from the end portion of said piston, said head portion being also formed with transversely extending passages having no direct communication with said first named passages, the hollow space within said piston being of greater width than the width of said head portion whereby the latter may be reciprocated within the same, a valve portion forming a part of said piston and cooperative with the radially extending passages of said head portion to alternatively divert a flow of fluid to either side of said valve portion and through said passages, said piston being formed with openings to either side of said valve portion and extending towards the adjacent cylinder ends, a guide portion connected to said head portion and extending beyond the same, a receiving element carried by said piston and having slidable contact with said guide portion, and said guide portion being formed with a passage having communication with the bore of the tube connected to said piston to allow for the flow of fluid from said receiving portion.

4. A control including a cylinder, a hollow piston slidable within said cylinder, said piston having an end portion and a central portion, the internal diameter of the latter portion being greater than that of the former, a tube connected to said piston and havinb its bore communicating with the hollow interior thereof, a control tube extending within the bore of said first named tube and beyond the end of the same, said control tube having its external diameter smaller than the internal diameter of said first named tube whereby to provide a passage for the flow of fluid between said tubes, a head portion fixed to the interior end of said control tube and formed with a series of radially extending passages communicating with its bore, said head having an end portion and a central portion, the external diameter of the latter being greater than that of the former and said end portion being adapted to slidably engage the end portion of said piston, said end portion being provided with a transverse passage for conducting fluid away from the end portion of said piston, said head portion being also formed with transversely extending passages having no direct communication with said first named passages, the hollow space within said piston being of greater width than the width of said head portion whereby the latter may be reciprocated within the same, a valve portion forming a part of said piston and cooperative with the radially extending passages of said head portion to alternatively divert a flow of fluid to either side of said valve portion and through said passages, said piston being formed with openings to either side of said valve portion and extending towards the adjacent cylinder ends, and said control head being formed with a groove in its edge and communicating with all of said radially extending passages, said groove being cooperative with the surface of said valve portion.

ELIAS ORSHANSKY, Jr.